United States Patent [19]

Massoubre

[11] 4,208,498
[45] Jun. 17, 1980

[54] CONTINUOUS SOLUTION POLYMERIZATION PROCESS

[75] Inventor: Jean-Marie Massoubre, Clermont-Ferrand, France

[73] Assignee: Compagnie Generale des Etablissements Michelin, Clermont-Ferrand, France

[21] Appl. No.: 947,003

[22] Filed: Sep. 29, 1978

Related U.S. Application Data

[62] Division of Ser. No. 723,514, Sep. 15, 1976, which is a division of Ser. No. 639,373, Dec. 10, 1975.

[51] Int. Cl.$^2$ .............................................. C08F 4/48
[52] U.S. Cl. .................................. 526/179; 526/180; 526/181; 526/182
[58] Field of Search ................ 526/182, 180, 181, 179

[56] References Cited

U.S. PATENT DOCUMENTS

| 3,207,742 | 9/1965 | Van deCastle | 526/179 |
|---|---|---|---|
| 3,301,840 | 1/1967 | Zelinshi | 526/180 |
| 3,312,680 | 4/1967 | Kahle | 526/182 |
| 3,318,862 | 5/1967 | Hinton | 526/182 |
| 3,324,191 | 6/1967 | Wofford | 526/174 |
| 3,366,611 | 1/1968 | Wofford | 526/179 |
| 3,429,829 | 2/1969 | Kahle | 526/182 |
| 3,450,685 | 6/1969 | Trepka et al. | 526/182 |
| 3,496,154 | 2/1970 | Wofford | 526/174 |
| 3,514,436 | 5/1970 | Trepka et al. | 526/182 |
| 3,640,988 | 2/1972 | Trepka et al. | 526/182 |

FOREIGN PATENT DOCUMENTS 1144603  5/1969  United Kingdom .

Primary Examiner—William F. Hamrock
Attorney, Agent, or Firm—Brumbaugh, Graves, Donohue & Raymond

[57] ABSTRACT

Continuous solution polymerization in an open type reactor of one or more conjugated dienes or of one or more conjugated dienes with one or more vinyl aromatic compounds, initiated by an organolithium initiator, without clogging of the reactor due to gel formation can be achieved by conducting the polymerization in the presence of a deactivating system which inhibits the formation of gels.

3 Claims, 7 Drawing Figures

CONTINUOUS SOLUTION POLYMERIZATION PROCESS

This application is a division of application Ser. No. 723,514, filed Sept. 15, 1976, which application Ser. No. 723,514 is a division of application Ser. No. 639,373, filed Dec. 10, 1975.

The present invention relates to improvements in the continuous solution homopolymerization or copolymerization of one or more conjugated dienes or of one or more conjugated dienes with one or more vinyl aromatic compounds under the influence of an organolithium initiator.

Such homopolymerizations or copolymerizations in solution can be carried out by continuous or batch processes. Continuous processes may be preferred in certain cases over batch polymerizatons, since they can be more advantageous from an economic standpoint. However, in the known continuous processes harmful "gels" are produced. These gels cover the walls of the reactors and make the control of the reaction progressively impossible. They cause, inter alia, a decrease in the conversion rates, variations in quality of the desired product, and finally lead to the stopping of the reaction by complete clogging of the reactors. The clogging of the reactors by the gels makes it necessary to shut down the reactors frequently in order to clean them, that is to say it rapidly results in interruptions in production which may continue for several days. These drawbacks have up to now retarded the use of continuous processes of such homo- or copolymerizations.

The research carried out by the applicant on the said gels has led to the discovery that these gels are formed primarily of "living" macromolecules swollen by solvents which have deposited on the walls of the reactors due to the viscosity of the solution, remaining there for a period of time definitely longer than the average time of retention of the rest of the reaction mixture. Still active, these macromolecules in permanent contact with the monomers of the reaction medium continue to increase in size on the spot without being able to emerge from the reactors and they become giant in size. This type of gel then proliferates progressively until it practically fills up all the reactor within only a few days of continuous operation. There is concerned here in fact the fouling of the reactors by molecules of very high molecular weight rather than by a gel conventionally formed of molecules which are cross linked to each other and insoluble in the reaction solvents.

The object of the present invention is, therefore, to prevent the formation of the special gels thus defined during the continuous solution polymerization or copolymerization of one or more conjugated dienes or of one or more conjugated dienes with one or more vinyl aromatic compounds under the influence of an organolithium initiator, so as to permit an operation of the reactors which can be really called continuous and which is therefore economically profitable and even more profitable than the batch processes.

The basic principle of the present invention consists in producing, in one or more continuous reactors of the "open" type, known also under the name of CSTR reactors (continuous stirred tank reactor), reaction conditions such that the average life of the "living" macromolecules is sufficiently shortened without the average degree of conversion being decreased. As a matter of fact, the life of the living macromolecules is considered unlimited [Szwarc—Nature, 178, 1168 (1956)] if one does not intervene in one manner or another.

Therefore, the process in accordance with the invention for the continuous solution homopolymerization or copolymerization in a hydrocarbon solvent, initiated by an organolithium initiator, of one or more conjugated dienes or of one or more conjugated dienes with one or more vinyl aromatic compounds in at least one reactor in which the monomers in solution in a hydrocarbon solvent are introduced continuously and from which the solution of homopolymers or copolymers formed and of unreacted monomers is also removed continuously, is characterized by the fact that the polymerization reaction is carried out in a reactor of the open type at a temperature of 20° C. to 110° C. and in the presence of a deactivating system which inhibits the formation of gels and which comprises:

(a) one or more agents which deactivate living macromolecules selected from the group consisting of transfer agents and termination agents, and (b) optionally, one or more agents which increase the reaction velocity of the living macromolecules formed on the deactivating agent or agents selected from the group consisting of organic polar agents and metallating agents, the components of the deactivating system and the initiator being present in amounts such that the ratio of the deactivation velocities of the living macromolecules to the propagation velocity of the polymerization reaction is between $1 \times 10^{-5}$ and $5 \times 10^{-3}$.

By the process in accordance with the invention it is possible to carry out the homo- or copolymerizations continuously for periods of time which may extend over several months without the inside of the reactor showing harmful masses of gel or even showing any trace of gel, or without the homopolymers or copolymers formed having suffered variations or losses in quality.

As already stated, two types of deactivation reactions are preferably used to effect a continuous operation of the process of the invention—on the one hand, the termination reactions leading to a loss of activity of the catalytic site on the living macromolecules and, on the other hand, the transfer reactions of the catalytic site on the living macromolecules either to the monomer or to the solvent or else to any other additive added to this solution.

In other words, the applicant has found that it was necessary to provide conditions producing competition between the deactivation reaction of the "living" polymers and copolymers and the propagation reaction which is spontaneously accompanied by the formation of gel from these "living" macromolecules. Thus the polymerization must take place in the presence of a "deactivating system" which inhibits the formation of gel, this system being formed of one or more living macromolecule deactivating agents selected from the group consisting of transfer agents and termination agents and, optionally, one or more agents accelerating the reactivity of the "living" polymers or copolymers formed on the deactivating agent or agents, said accelerating agent or agents being selected from the group consisting of organic polar agents and metallating agents. Furthermore, the component or components of the inhibiting system and the initiator must be present in amounts such that the ratio of the deactivation velocities of the living macromolecules to the propagation velocity of the polymerization is between $10^{-5}$ and $5 \times 10^{-3}$.

In the event that there is only one transfer or termination reaction, the value of the said ratio can be obtained in particular by means of the following two equations:

$$\frac{V_t}{V_p} = MW\left(\frac{1}{Mn} - \frac{I_o}{C}\right) \qquad (1)$$

and $$\frac{V_D}{V_p} = MW\left(\frac{I_o}{C} - \frac{1}{Mn}\right) \qquad (2)$$

in which:

$V_t$ is the velocity of the transfer reaction, $V_D$ is the velocity of the termination reaction, $V_p$ is the overall apparent velocity of the polymerization reaction, referred to in the present specification as the propagation velocity of the polymerization reaction, MW is the molecular weight of the monomer in the case of homopolymerization or of the mean molecular weight of the monomers, determined as follows, in the case of copolymerization:

$$MW = \frac{100}{\frac{a}{W_A} + \frac{b}{W_B}}$$

$W_A$ and $W_B$ being respectively the molecular weights of the copolymerized monomers, and a and b being the respective percentages by weight of the two monomers in the copolymer formed, $I_0$ is the concentration of active initiator in mols per 100 g. of monomer(s) entering the reactor, C is the percentage conversion by weight of the monomers into polymer or copolymer, and Mn is the number average molecular weight of the polymer or copolymer formed, determined experimentally by osmometry.

These calculations assume that the initiation reaction is instantaneous or very short as compared with the time of the propagation reaction and that the effectiveness of the initiator is 100%, which is generally the case.

Although the proportions or amounts of the constituents of the "deactivating system" are variable first of all due to their nature and then due to the respective quantities used, one can obtain reaction conditions such that the average life of the "living" macromolecules is shortened. If one employs conditions such that the value of the ratio of the deactivation velocities of the living macromolecules to propagation velocity of the polymerization reaction is smaller than the lower limit value indicated above, there will be the formation of gel and therefore complete obstruction of the reactor or reactors. On the other hand, if one selects conditions such that the value of the said ratio exceeds the above indicated upper limit value, while there will be no formation of gel, one will obtain polymers of low molecular weight or even liquid polymers instead of obtaining the desired polymers of high molecular weight for the preparation of which the formation of gels is particularly critical.

A variant embodiment consists in using one or more reagents in such proportions or amounts that they satisfy both the function of deactivating agent for the living macromolecules and another function which may be either that of agent for increasing the reaction velocity of the living macromolecular polymers or copolymers, or solvent, or else as reaction monomer compound.

Thus for example, toluene which is a transfer agent under certain conditions of temperature and polarity, may also be a solvent of the monomers and polymers or copolymers formed. I have as a matter of fact found that in toluene medium, contrary to the teachings in the specialized literature [Hsieh. J. of Poly Sc. 3, 153–61 (1965)], the transfer reaction could take place on the toluene molecule.

Still by way of illustration and not of limitation, hexamethylphosphorotriamide may be a termination agent and an organic polar agent and vinyl toluene may be a starting monomer and a transfer agent.

As conjugated dienes there can be used butadiene-1,3, 2,3-dimethyl-1,3-butadiene, 2-methyl-1,3-butadiene, pentadiene-1,3, 2,4-hexadiene, etc.

Representative vinyl aromatic compounds include styrene, ortho-, meta-, and para-methyl styrene, "vinyl toluene", di- and polymethyl styrenes, p-tertio-butylstyrene, vinyl naphthalenes, methoxy styrenes, vinyl mesitylene, divinyl benzene, the chlorostyrenes, etc.

Suitable solvents include aliphatic, cycloaliphatic or aromatic hydrocarbon solvents such as toluene, heptane, etc.

By organolithium intiator it will be understood any organolithium compound comprising one or more carbon-lithium bonds, as well as any ionic-radical adduct of lithium and certain polynuclear aromatic hydrocarbons, as well as metallic lithium itself.

Representative compounds include the aliphatic organolithiums such as ethyllithium, n-butyllithium, isobutyllithium, sec-butyllithium, tert-butyllithium, isopropyllithium, n-amyllithium, isoamyllithium; the alkene organolithiums such as allyllithium, propenyllithium, isobutenyllithium; the dilithium polymethylenes such as 1,4-dilithiobutane, 1,5-dilithiopentane, 1,20-dilithioeicosane; the polylithiums resulting from the reaction of metallic lithium with aryl substituted ethylene compounds such as 1,1-diphenyl ethylene, trans-stilbene, tetraphenyl ethylene; the radical ions such as lithium-naphthalene, lithium-anthracene, lithium-chrysene, lithium-diphenyl, etc.

The transfer agents which can be used include all compounds having a metalatable site, such as those (R) which have a mobile hydrogen (H) and react in accordance with the scheme:

(PLi=living polymer; RLi=new organolithium compound; PH=dead polymer) and such as those having an exchangeable halogen X in accordance with the reaction:

The compounds having a mobile hydrogen which can be used are illustrated by way of example but not of limitation by the compounds having a hydrogen in α of an aromatic ring such as toluene, xylene, diphenylmethane, triphenylmethane, fluorene, indene; compounds having a hydrogen in α of an ethylene double bond such as cyclopentadiene, dicyclopentadiene, cyclohexadiene-1,4, pentadiene-1,4; acetylene compounds such as vinyl acetylene, propyne and allene derivatives capable of isomerizing into true acetylenes such as butadiene-1,2; the primary and secondary amines. As compounds having an exchangeable halogen there can be used compounds such as, for instance, butyl chloride, butyl bromide, and bromobenzene.

By way of termination agents which can be used there are suitable all reagents capable of destroying, with rather low reaction velocity, the carbonlithium bond of the polymers formed but without substantially affecting the propagation reaction. Purely by way of illustration mention may be made of: the heavy alcohols of the formula $C_nH_{2n+1}OH$ with $n \geq 4$, the corresponding carboxylic acids, the halogenated compounds RX reacting in accordance with a Wurtz reaction $(RX+PLi \rightarrow SX Li+RP)$ such as benzyl chloride, benzyl bromide, etc.

As the optionally used agents for increasing the reaction velocity of the living macromolecular polymer formed on the deactivating agent or agents there may be mentioned organic polar agents such as the cyclic or noncyclic ethers (e.g., tetrahydrofuran), the thioethers, the polyethers, the tertiary amines and polyamines, the phosphoramides, and various metallating agents such as the alcoholates of alkali metals other than lithium, the keto metals of alkali metals other than lithium (i.e., complexes between compounds having a keto function and alkali metals other than lithium), mixed complexes of an alkali metal and an organo-aluminum or organo-zinc compound such as complex compounds of the formula $MeZn(R)_3$, $MeAl(R)_4$ in which Me represents an atom of alkali metal such as sodium, potassium, cesium and rubidium and R is an alkyl radical, as well as the compounds of the formula $MeHAlHR_2$ in which Me has the same meaning as previously, R is an alkyl or alkoxy radical possibly substituted by an alkoxy radical, Al represents an aluminum atom and in particular sodium dihydro-bis(2-methoxyethoxy) aluminate $NaAlH_2(OCH_2CH_2OCH_3)_2$, sodium diethyl aluminum hydride, $NaAlH_2(C_2H_5)_2$ or else a combination of orgainic polar agents and metallating agents.

The compounds obtained in accordance with this process can be used as the main component of mixtures serving for the manufacture of elastic objects, and particularly pneumatic tires.

As used herein, "metallation" is the reaction between a compound having a metal atom and being capable of giving it up (i.e., a "metallating" agent) and a compound having a site capable of receiving a metal atom (i.e., a "metallatable" agent).

The invention will be better understood from a reading of the following examples, given solely by way of illustration.

EXAMPLE 1

Continuous copolymerization without deactivation reaction (known prior art process).

Into three identical reactors of 14 liters useful capacity arranged in cascade with agitators of the turbine type rotating at 700 to 1100 rpm. butadiene and styrene were continuously introduced in a weight ratio of 69% and 31%, respectively, with a solution of active n-butyllithium in heptane corresponding to 0.05 part by weight of initiator to 100 parts by weight of monomers (i.e., 0.05 pcm.) and a solution of tetrahydrofuran (THF) in heptane such that there were between 450 and 550 ppm. of tetrahydrofuran in the reaction medium. The rates of flow of these different solutions were calculated so as to have an average retention time in all three reactors of between 1 to 2 hours and so as to obtain at the outlet of the third reactor a solution of butadiene-styrene copolymer in heptane (90%) and residual unreacted monomers corresponding to a conversion rate of 90%. Depending on the experimental conditions selected the temperatures being maintained constant and between 20° C. and 110° C., there has been found the formation of gel which rapidly makes control of the reaction very difficult and leads to a stopping of the operation of the reactors at the end of at least 2 days and at most 6 days.

EXAMPLE 2

Test A—Continuous copolymerization without deactivation reaction

Figure 1A:
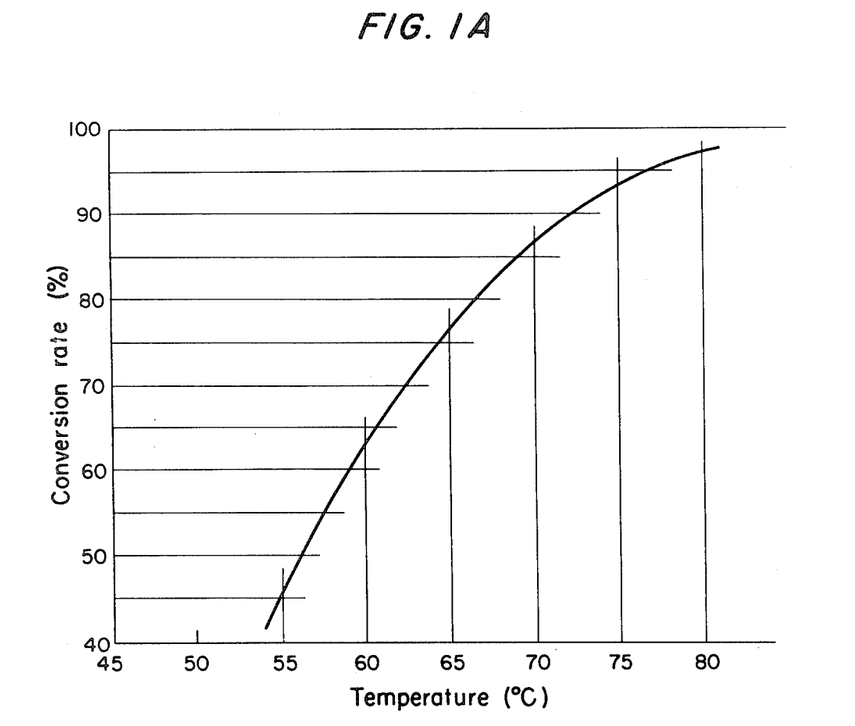

The same conditions were used as previously in Example 1, but employing a single reactor in order to study the variations of the inherent viscosity and of the conversion rate as a function of the reaction temperature. The results are set forth in Table A below:

Table A

| Temperature | 55° C. | 65° C. | 70° C. | 75° C. |
|---|---|---|---|---|
| Conversion rate (%) | 45 | 77 | 88 | 93 |
| Inherent Viscosity | 0.94 | 1.02 | 1.17 | 1.28 | and in the curve of FIG. 1 A.

In these tests, the stopping of the reactor takes place after 2-6 days of operation, the reactor being filled with gel.

Test B—Continuous copolymerization in accordance with the invention

The equipment of Test A was used under the following conditions:

Average retention time in the reactor: 1 hour–1½ hour
Active n-butyllithium (n-BuLi): 0.020 pcm.
HMPT/active n-butyllithium in moles: 0.4 [the hexamethylphosphorotriamide (HMPT) being both termination agent and organic polar agent]
Weight ratio monomers/heptane: ⅛
Weight ratio butadiene/styrene: 74/26.

Figure 1B:
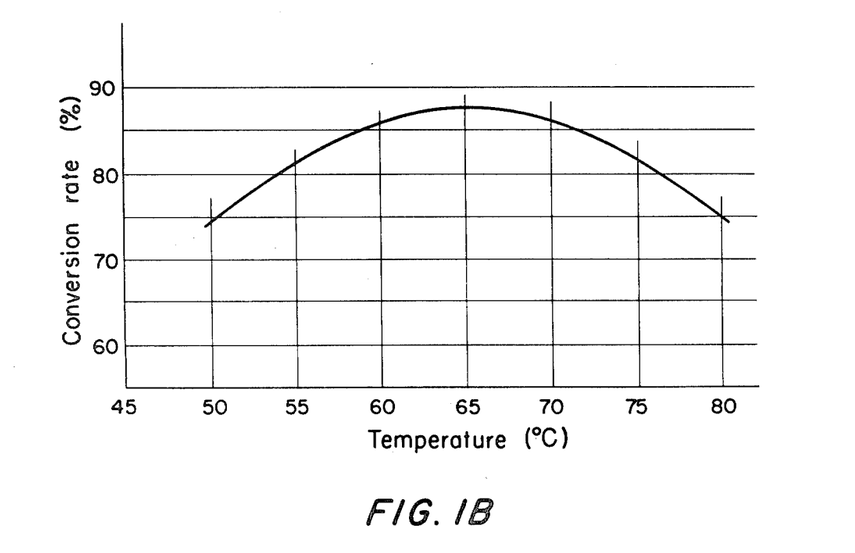

The conversion rate was studied as a function of the reaction temperature as previously and the results are set forth in the form of the curve of FIG. 1B.

A comparison between the two curves 1A and 1B permits the conclusion that within the same temperature interval the conversion rate continuously increases when the temperature increases, which is characteristic of an absence of termination reaction (FIG. 1A), while the analogous curve corresponding to copolymerization with termination reaction (FIG. 1B) shows a maximum which characterizes a termination reaction.

Under the conditions defined above in Test B and at a temperature of 70° C., the reactor produced rubber for more than two and a half months of continuous operation without any formation of gel.

EXAMPLE 3

The homopolymerization of butadiene was effected with the equipment already described in the preceding Example 2. One operates in the presence of heptane as solvent and of benzylchloride as termination agent under the following conditions:

Average retention time in the reactor: 45 minutes
Polymerization temperature: 60° C.
Active n-butyllithium: 0.100 pcm.
Weight ratio butadiene/heptane: 1/7

Molar ratio benzylchloride/active n-butyllithium: 1
Tetrahydrofuran (organic polar agent) in variable quantities The results obtained are set forth in Table B below:

Table B

| Tetrahydrofuran in pcm. | Conversion Rate (%) | Inherent Viscosity | Mn | $\frac{V_D}{V_p}$ |
| --- | --- | --- | --- | --- |
| 0 | 78 | 1.63 | 58,000 | $1.51 \times 10^{-4}$ |
| 0.05 | 70 | 1.53 | 70,000 | $4.35 \times 10^{-4}$ |
| 0.1 | 74.5 | 1.64 | 103,000 | $6.1 \times 10^{-4}$ |
| 0.2 | 77 | 1.95 | 127,000 | $6.73 \times 10^{-4}$ |
| 0.4 | 74 | 1.90 | 132,000 | $7.32 \times 10^{-4}$ |

It is noted that the conversion rate remains substantially constant whatever the amount of tetrahydrofuran used and that the latter increases the reaction velocity of the "living" macromolecular polymer in the benzylchloride.

EXAMPLE 4

The homopolymerization of butadiene was effected continuously with the equipment described above in Example 2. It was carried out in the presence of heptane as solvent and with lauryl alcohol or dodecanol-1 as termination agent under the following conditions:

Average retention time in the reactor: 45 minutes
Polymerization temperature: 76° C.
Active n-butyllithium: 0.100 pcm.
Weight ratio butadiene/heptane: 1/7
Molar ratio lauryl alcohol/active n-butyllithium: variable.

The results are set forth in Table C below:

Table C

| Molar Ratio $\frac{\text{Lauryl alcohol}}{\text{n-butyllithium}}$ | Conversion Rate (%) | Inherent Viscosity | Mn | $\frac{V_D}{V_p}$ |
| --- | --- | --- | --- | --- |
| 0.5 | 74.5 | 2.21 | 228,000 | $8.9 \times 10^{-4}$ |
| 0.75 | 62 | 2.47 | 143,000 | $9.7 \times 10^{-4}$ |

EXAMPLE 5

This copolymerization was carried out with the equipment already described in Example 2 under the following conditions, with toluene as solvent:

Average retention time in the reactor: 45 minutes
Weight ratio butadiene/styrene: 71/29
Weight ratio monomers/toluene: 1/7
Active n-butyllithium: 0.035 pcm.; that is to say $I_o = 5.47 \times 10^{-4}$ mols per 100 grams of monomers
Tetrahydrofuran in toluene: 265 ppm.

The toluene, a solvent, acts also as transfer agent while the tetrahydrofuran, an organic polar agent, increases the reaction velocity of the "living" macromolecular copolymer on the toluene.

Figure 2A:
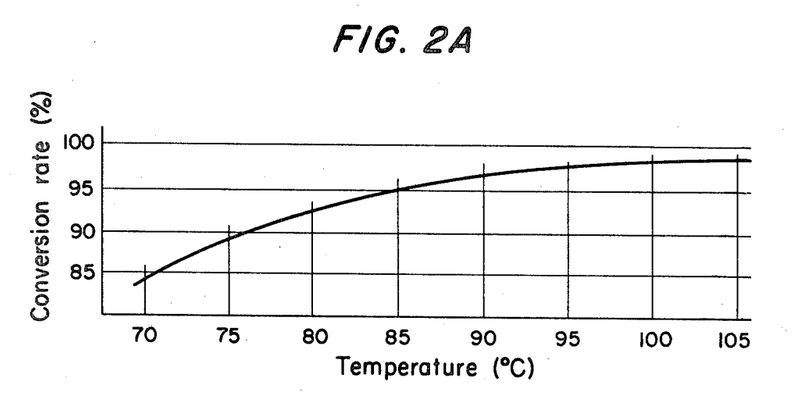
Figure 2B:
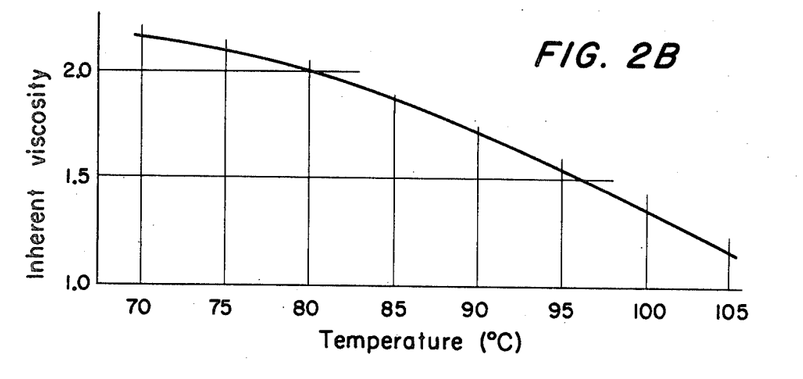

The reactor was intentionally stopped after more than 2 months of continuous operation. No formation of gel was noted. The results obtained are presented in the form of curves (FIGS. 2A, 2B, and 2C). FIG. 2A shows the conversion rate reached as a function of the temperature, while FIG. 2B shows the inherent viscosity of the copolymers formed at different temperatures. These results show, on the one hand that when the temperature increases the conversion rate increases and at the same time the inherent viscosity decreases, which is characteristic of the presence of the transfer reaction and, on the other hand, that the transfer agent is toluene, since when the copolymerization is carried out with the same reagents as used above but in solution in heptane, it does not give rise to such decrease in inherent viscosity and the reactor stops operating within a period of time ranging from 4–6 days, as indicated in Example 2, Test A.

Figure 2C:
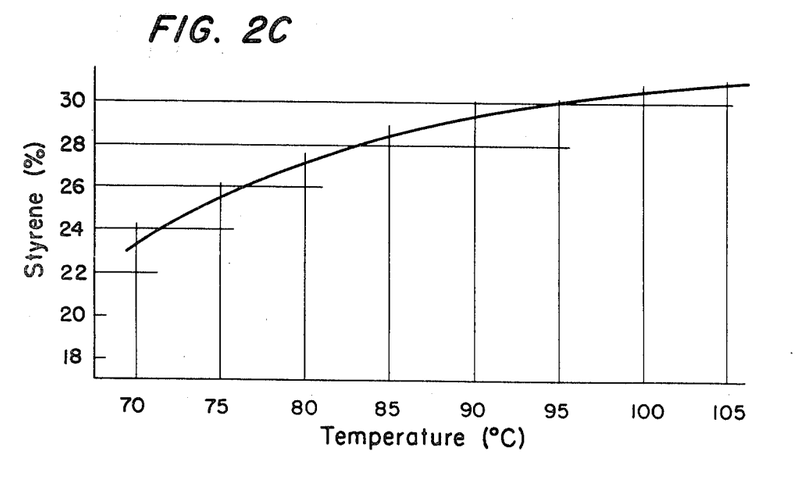

FIG. 2C shows the amount of styrene incorporated in the copolymer.

Based on the number average molecular weights (Mn) established by osmometry and the results obtained and set forth in the form of a curve, there were determined the values of the ratio of the velocity of the transfer reaction ($V_t$) and the propagation velocity of the polymerization reaction ($V_p$) for different temperatures.

The values are set forth in Table D:

Table D

| Temperature °C. | Mn | MW | $\frac{V_t}{V_p}$ |
| --- | --- | --- | --- |
| 70 | 148,000 | 60.9 | $2.0 \times 10^{-5}$ |
| 75 | 138,000 | 61.5 | $7.2 \times 10^{-5}$ |
| 80 | 130,000 | 62.1 | $1.13 \times 10^{-4}$ |
| 85 | 122,000 | 62.5 | $1.52 \times 10^{-4}$ |
| 90 | 109,000 | 62.8 | $2.21 \times 10^{-4}$ |
| 95 | 97,000 | 63.1 | $3.0 \times 10^{-4}$ |
| 100 | 81,000 | 63.4 | $4.33 \times 10^{-4}$ |
| 105 | 66,000 | 63.5 | $6.12 \times 10^{-4}$ |

EXAMPLE 6

The following conditions were employed in a 32.5 liter reactor, in toluene, using the system n-butyllithium/tetrahydrofuran:

Active n-butyllithium: 0.035 pcm.
Weight ratio monomers/toluene: 1/7
Weight ratio butadiene/styrene: 71/29
Temperature: 75° C.
Average retention time in the reactor: 45 minutes
Tetrahydrofuran in toluene: 340 to 525 ppm.

The operation of the reactor continued without interruption for more than 2 months and without any formation of gel. The same test, carried out in heptane, lead to the stopping of the reactor within 6 days.

EXAMPLE 7

The copolymerization was effected continuously varying the reaction temperature in the equipment described above in Example 6 and under the following conditions with toluene as solvent and fluorene as transfer agent:

Average retention time in the reactor: 45 minutes
Active n-butyllithium: 0.035 pcm., that is to say $I_o = 5.47 \times 10^{-4}$ moles per 100 grams of monomers
Weight ratio butadiene/styrene: 71/29
Weight ratio monomers/toluene: 1/7
Molar ratio fluorene/n-butyllithium: 1/5.

The results obtained are set forth in Table E:

Table E

| Copolymerization Temperature (°C.) | Conversion Rate (%) | Inherent Viscosity | Amount of Styrene Incorporated | Mn | MW | $\frac{V_t}{V_p}$ |
|---|---|---|---|---|---|---|
| 67 | 73 | 0.89 | 23 | 41,500 | 60.7 | $10.1 \times 10^{-4}$ |
| 76 | 91 | 1.01 | 26 | 47,500 | 61.7 | $9.3 \times 10^{-4}$ |
| 87 | 98 | 0.87 | 28 | 47,000 | 62.4 | $9.8 \times 10^{-4}$ |
| 93 | 99 | 0.87 | 28.5 | 44,000 | 62.5 | $10.75 \times 10^{-4}$ |

It is noted that the viscosity of the copolymers obtained is already low and that if the value of the ratio $V_t V_p$ were still larger the polymers obtained would no longer have sufficient viscosity for use in pneumatic tires.

EXAMPLE 8

Two continuous copolymerization tests were carried out, the second in the presence of sodium dihydro-bis (2-methoxyethoxy) aluminate (SDMA) as a metallating agent, while the first was carried out without this compound, under the following identical conditions:

Average retention time in the reactor: 1 hour
Temperature of the copolymerization: 87–88° C.
Toluene as solvent (and transfer agent in second test)
Weight ratio butadiene/styrene: 75/25
Weight ratio monomers/toluene: 1/7
Active n-butyllithium: 0.045 pcm.

The results of the two tests are set forth in Table F:

Table F

| Molar Ratio $\frac{SDMA}{\text{n-butyl-lithium}}$ | Conversion Rate (%) | Inherent Viscosity | Mn | Amount of Styrene Incorporated | $\frac{V_t}{V_p}$ |
|---|---|---|---|---|---|
| 0 | 91 | 1.9 | 130,000 | 18 | ~ 0 |
| 0.01 | 91 | 1.53 | 87,000 | 18 | $2.24 \times 10^{-4}$ |

It was noted that since the first reactor in which the test was carried out did not contain a metallating agent, it was fouled by the end of a few days, while in the second reactor there was no harmful formation of gel. Thus, the metallating agent permitted the toluene to function as a transfer agent.

EXAMPLE 9

Two copolymerization tests were again carried out and, as in the preceding Example 8, only the second test was carried out in the presence of sodium tetraethylaluminate [NaAl(CH$_2$H$_5$)$_4$] as a metallating agent. The conditions were as follows:

Average retention time in the reactor: 1 hour
Temperature of the copolymerization: 87–88° C.
Toluene as solvent (and transfer agent in second test)
Weight ratio butadiene/styrene: 75/25
Weight ratio monomers/toluene: 1/7
Active n-butyllithium: 0.060 pcm.

The results of the two tests are set forth in Table G:

Table G

| Molar Ratio $\frac{NaAl(C_2H_5)_4}{\text{n-butyl-lithium}}$ | Conversion Rate (%) | Inherent Viscosity | Mn | Amount of Styrene Incorporated | $\frac{V_t}{V_p}$ |
|---|---|---|---|---|---|
| 0 | 90 | 1.5 | 96,000 | 20 | ~ 0 |
| 0.005 | 90 | 1.2 | 66,000 | 20 | $3.21 \times 10^{-4}$ |

As in the preceding Example 8, it was found that the presence of the metallating agent permitted the toluene to function as a transfer agent.

EXAMPLE 10

Again two continuous copolymerization tests were carried out, the first in the presence of a solution of n-butyllithium and the second in the presence of a solution of n-butyllithium and sodium-naphthalene (a metallating agent) with an atomic ratio of Na/Li = 1/30 and an overall concentration of alkaline product of 0.19 N. The two tests were carried out under the following conditions:

Average retention time in the reactor: 1 hour
Temperature of the copolymerization: 90° C.
Toluene as solvent (and transfer agent in second test)
Weight ratio butadiene/styrene: 75/25
Weight ratio monomers/toluene: 1/9
Active n-butyllithium: 0.070 pcm.

The results are set forth in Table H:

Table H

| Atomic Ratio: $\frac{Na}{Li}$ | Conversion Rate (%) | Inherent Viscosity | Mn | Amount of Styrene Incorporated | $\frac{V_t}{V_p}$ |
|---|---|---|---|---|---|
| 0 | 91 | 1.29 | 83,000 | 20 | ~ 0 |
| 1/30 | 94 | 0.62 | 27,000 | 23 | $15.5 \times 10^{-4}$ |

Once again the presence of the metallating agent enabled the toluene to function as a transfer agent.

EXAMPLE 11

Several butadiene and styrene copolymerization tests were carried out in the presence of benzophenone-potassium (a metallating agent) having a potassium concentration of 0.097 N, with different benzophenone-potassium/n-butyllithium molar ratios. The other conditions were identical, namely:

Average retention time in the reactor: 45 minutes
Temperature of the copolymerization: 80° C.
Weight ratio butadiene/styrene: 1/29
Toluene as solvent and transfer agent
Weight ratio monomers/toluene: 1/7

Active n-butyllithium: 0.035 pcm., that is to say $I_o = 5.47 \times 10^{-6}$ mols per 100 g. of monomers.

The results of the tests are set forth in Table J:

Table J

| Molar Ratio Benzophenone-potassium / n-butyllithium | Conversion Rate (%) | Inherent Viscosity | Mn | Amount of Styrene Incorporated | $\dfrac{V_t}{V_p}$ |
|---|---|---|---|---|---|
| $1 \times 10^{-4}$ | 80 | 1.46 | 90,000 | 17 | $2.48 \times 10^{-4}$ |
| $1 \times 10^{-3}$ | 74 | 1.12 | 62,000 | 14.5 | $5.07 \times 10^{-4}$ |
| $5 \times 10^{-3}$ | 67 | 0.92 | 45,000 | 12 | $8.12 \times 10^{-4}$ |

EXAMPLE 12

(transfer + termination)

The reaction was carried out in a 14 liter reactor fed with a solution of butadiene (72%) and styrene (27%) in toluene under the following conditions:

Weight ratio monomers/toluene: 1/7
Average retention time in the reactor: 20 minutes
Active n-butyllithium in the toluene: 0.035 pcm.
Hexamethylphosphorotriamide: 0.10 pcm.
The temperature was varied from 35° C. to 60° C.

No trace of gel was observed in the reactor after more than two months of operation.

Figures 3A, 3B:
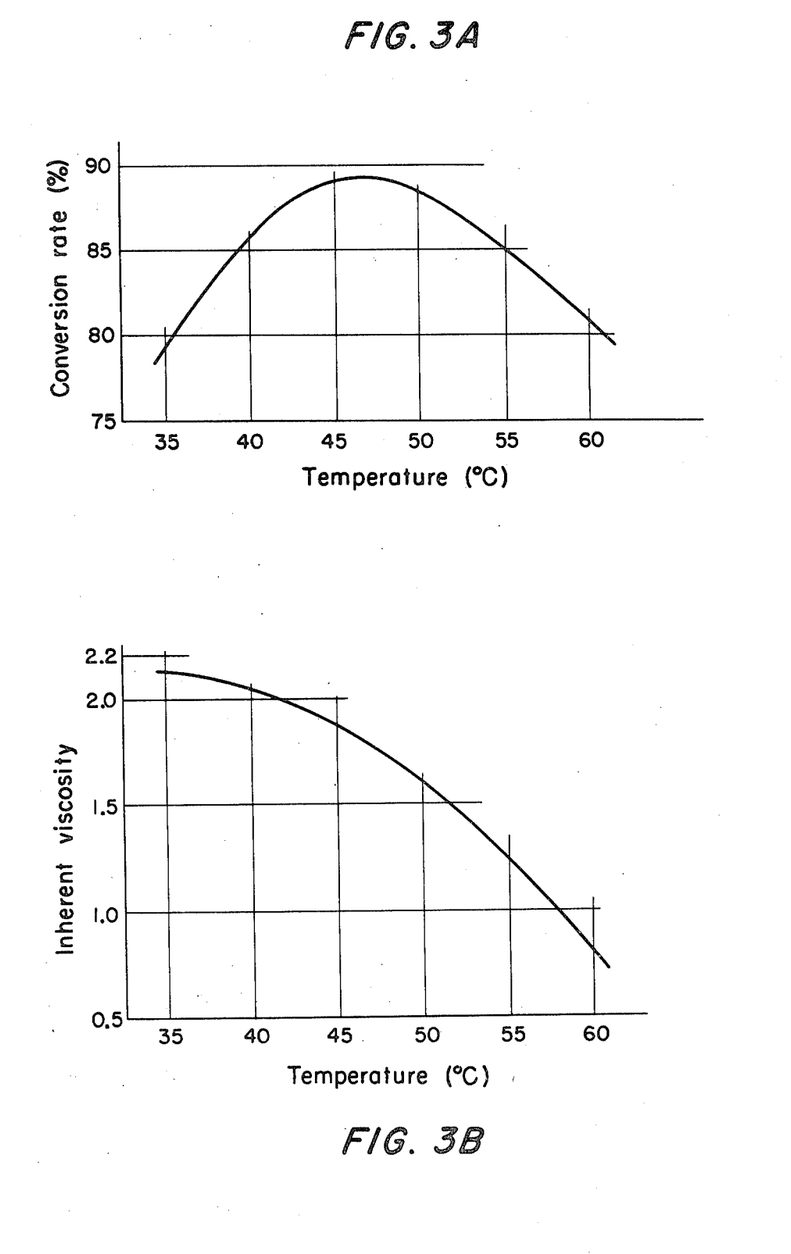

The results are set forth in the form of curves. FIG. 3A shows the rate of conversion reached as a function of the temperature, while FIG. 3B shows the inherent viscosity as a function of the temperature.

These curves show, respectively, that the conversion rate reached passes through a maximum, that is to say that there is a termination reaction, and that the viscosity decreases when the temperature rises, that is to say that there is a transfer reaction.

The same test, carried out in heptane but with tetrahydrofuran (THF), leads in less than a week to a shutting down of the reactor (See Example 2, Test A).

It is evident from the above examples that the process of the invention must be carried out in continuous reactors of the "open" type, that is to say of the CSTR (continuous stirred tank reactor), type, in order, on the one hand, to avoid any formation of gel and, on the other hand, to obtain polymers of copolymers of high molecular weight.

What is claimed is:

1. A process for the continuous solution homopolymerization or copolymerization in a hydrocarbon solvent, initiated by an organolithium initiator, of at least one conjugated diene or of at least one conjugated diene with at least one vinyl aromatic compound in at least one reactor in which the monomers in solution in a hydrocarbon solvent are introduced continuously and from which the solution of homopolymers or copolymers formed and of unreacted monomers is also removed continuously, characterized by the fact that the polymerization reaction is carried out in a reactor of the open type at a temperature of 20° C. to 110° C. and in the presence of a deactivating system which inhibits the formation of gels and which comprises (a) a termination agent which deactivates living macromolecules, said termination agent being benzyl chloride or benzyl bromide, and (b) an organic polar agent which increases the reaction velocity of living macromolecules, said organic polar agent being selected from the group consisting of a cyclic ether, a noncyclic ether, a thioether, a polyether, a tertiary amine, a polyamine and a phosphoramide; the components of the deactivating system and the initiator being present in amounts such that the ratio of the deactivation velocities of the living macromolecules to the propagation velocity of the polymerization reaction is between $1 \times 10^{-5}$ and $5 \times 10^{-3}$.

2. The process according to claim 1, characterized by the fact that the organolithium initiator is n-butyllithium and the starting monomers are butadiene and styrene.

3. The process according to claim 1, characterized by the fact that the monomer is butadiene.

* * * * *

UNITED STATES PATENT AND TRADEMARK OFFICE
CERTIFICATE OF CORRECTION

PATENT NO. : 4,208,498
DATED : June 17, 1980
INVENTOR(S) : Jean-Marie Massoubre

It is certified that error appears in the above-identified patent and that said Letters Patent are hereby corrected as shown below:

Col. 5, line 13, "(RX + PLi → SX Li + RP)" should read -- (RX + PLi → X Li + RP) --; line 37 "orgainic" should read -- organic --. Col. 6, line 39, "$\frac{1}{8}$" should read -- 1/8 --.

Col. 9, line 18, "$V_t V_p$" should read -- $\frac{V_t}{V_p}$ --; line 57, "[NaAl(CH$_2$H$_5$)$_4$]" should read -- [NaAl(C$_2$H$_5$)$_4$] --. Col. 10, line 66, "1/29" should read -- 71/29 --.

Signed and Sealed this

Fourteenth Day of October 1980

[SEAL]

Attest:

SIDNEY A. DIAMOND

Attesting Officer      Commissioner of Patents and Trademarks